(12) United States Patent
Murashita et al.

(10) Patent No.: US 8,311,367 B2
(45) Date of Patent: Nov. 13, 2012

(54) IMAGE PROCESSING DEVICE

(75) Inventors: Kimitaka Murashita, Kawasaki (JP); Masayoshi Shimizu, Kawasaki (JP); Kaoru Chujo, Kawasaki (JP); Takashi Wakamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 638 days.

(21) Appl. No.: 12/403,027

(22) Filed: Mar. 12, 2009

(65) Prior Publication Data
US 2009/0232416 A1    Sep. 17, 2009

(51) Int. Cl.
*G06K 9/32* (2006.01)

(52) U.S. Cl. ........ 382/294; 382/260; 382/282; 382/107; 382/154; 348/154

(58) Field of Classification Search .......... 382/154, 382/294, 107, 260, 282; 348/154
See application file for complete search history.

(56) References Cited

U.S. PATENT DOCUMENTS

| | | | | |
|---|---|---|---|---|
| 5,963,675 | A * | 10/1999 | van der Wal et al. | 382/260 |
| 5,982,951 | A * | 11/1999 | Katayama et al. | 382/284 |
| 6,122,004 | A * | 9/2000 | Hwang | 348/208.13 |
| 6,459,500 | B1 | 10/2002 | Takaoka | |
| 6,804,418 | B1 | 10/2004 | Yu et al. | |
| 6,804,419 | B1 | 10/2004 | Miyake | |
| 6,876,367 | B2 * | 4/2005 | Wada et al. | 345/690 |
| 6,952,234 | B2 | 10/2005 | Hatano | |
| 7,133,068 | B2 * | 11/2006 | Fisher et al. | 348/218.1 |
| 7,180,043 | B2 | 2/2007 | Washisu | |
| 7,409,106 | B2 | 8/2008 | Aiso | |
| 7,686,454 | B2 * | 3/2010 | Iketani et al. | 353/30 |
| 7,847,823 | B2 | 12/2010 | Habuka et al. | |
| 7,912,319 | B2 * | 3/2011 | Lakshamanan et al. | 382/284 |
| 2002/0047901 | A1 * | 4/2002 | Nobori et al. | 348/149 |
| 2002/0140829 | A1 * | 10/2002 | Colavin et al. | 348/231.99 |
| 2003/0025811 | A1 * | 2/2003 | Keelan et al. | 348/239 |
| 2003/0071905 | A1 * | 4/2003 | Yamasaki | 348/239 |
| 2004/0022417 | A1 * | 2/2004 | Nishigaki et al. | 382/104 |
| 2004/0184677 | A1 * | 9/2004 | Raskar et al. | 382/284 |
| 2005/0135670 | A1 * | 6/2005 | Vaidyanathan | 382/154 |

(Continued)

FOREIGN PATENT DOCUMENTS

JP        01-160981        6/1992

(Continued)

OTHER PUBLICATIONS

Japanese Office Action issued Feb. 1, 2011 in corresponding Japanese Patent Application 2008-534194.

*Primary Examiner* — Jayesh A Patel

(74) *Attorney, Agent, or Firm* — Fujitsu Patent Center

(57) ABSTRACT

Adaptive image processing device performs image processing with a simple configuration on a composite image including areas having different characteristics by changing a process depending on the number of combined images in each area of the composite image configured by combining a plurality of images. The image processing device acquires a plurality of images and generates a composite image. When the composite image is generated, the image processing device realizes a process of determining the number of combined images for detecting the number of images to be combined for each area of the composite image and holding the number as information about the number of combined images, and an image processing parameter switching process for switching a parameter of image processing to be performed on each area of the composite image according to the information about the number of combined images.

14 Claims, 13 Drawing Sheets

U.S. PATENT DOCUMENTS

| | | | |
|---|---|---|---|
| 2005/0169555 A1* | 8/2005 | Hasegawa | 382/284 |
| 2007/0041659 A1* | 2/2007 | Nobori et al. | 382/284 |
| 2008/0112644 A1* | 5/2008 | Yokohata et al. | 382/278 |

FOREIGN PATENT DOCUMENTS

| | | |
|---|---|---|
| JP | 08-194113 | 7/1996 |
| JP | 10-243288 | 9/1998 |
| JP | 11-266358 | 9/1999 |
| JP | 3022274 | 3/2000 |
| JP | 3023374 | 3/2000 |
| JP | 2000-194845 | 7/2000 |
| JP | 3408770 | 3/2003 |
| JP | 2003-134385 | 5/2003 |
| JP | 2003-143484 | 5/2003 |
| JP | 2004-229004 | 8/2004 |
| JP | 2004-357040 | 12/2004 |
| JP | 2008078959 A * | 4/2008 |
| WO | 2006/075394 A1 | 7/2006 |

* cited by examiner

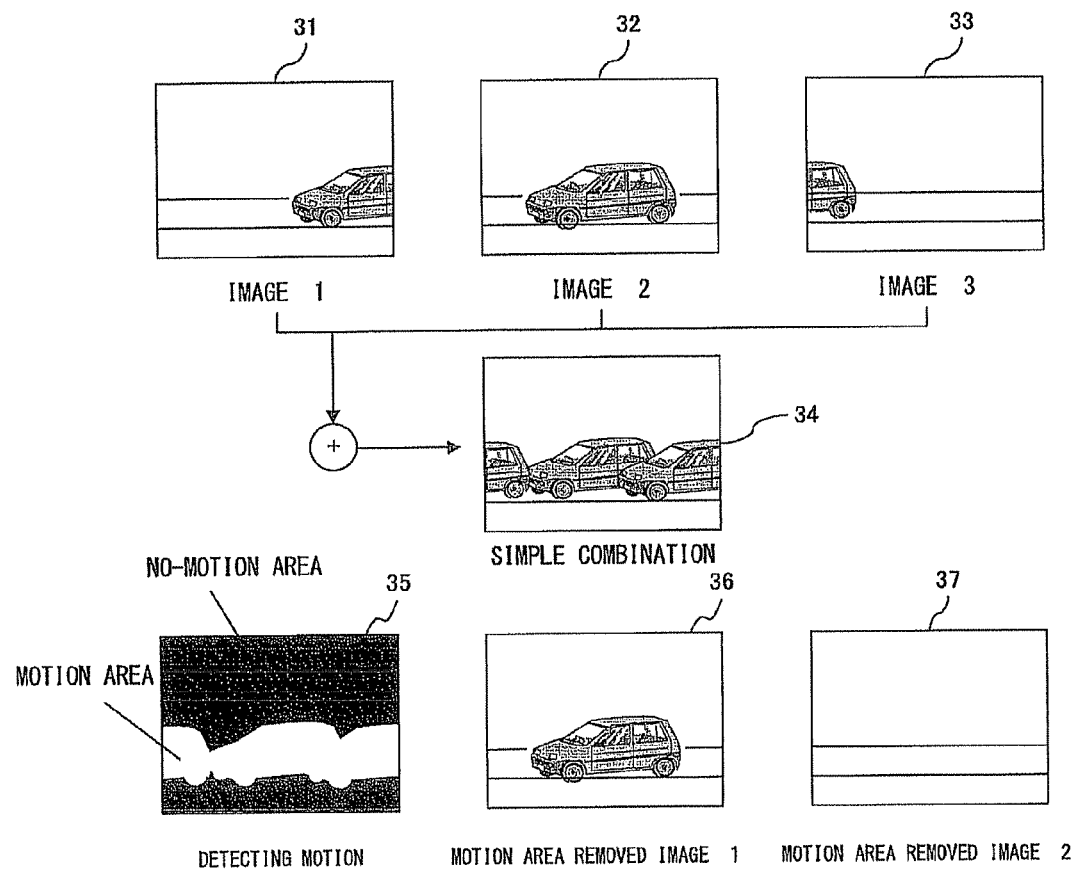
F I G. 3

| NUMBER OF COMBINED IMAGES | 1 | 2 | 3 |
|---|---|---|---|
| OUTLINE INTENSITY | 30 | 20 | 10 |

FIG. 7

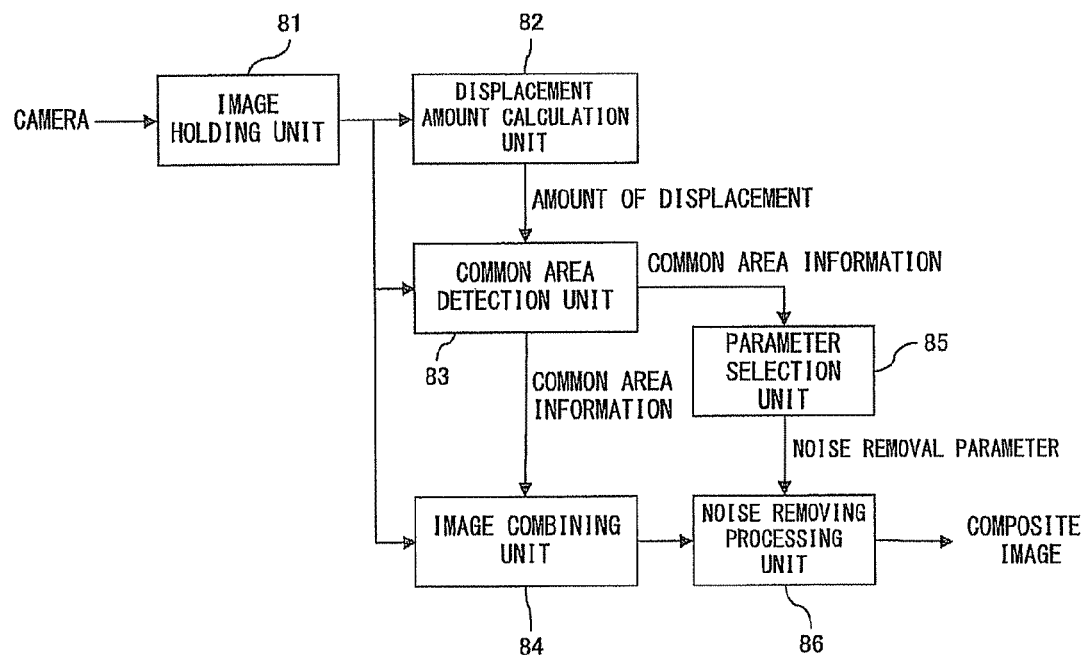
F I G. 8

| NUMBER OF COMBINED IMAGES | 1 | 2 | 3 |
|---|---|---|---|
| FILTER SIZE | 5×5 | 3×3 | 1×1 |

FIG. 9

| NUMBER OF COMBINED IMAGES | 1 | 2 | 3 |
|---|---|---|---|
| INCLINATION | 3 | 1.5 | 1 |

FIG. 12

IMAGE PROCESSING DEVICE

CROSS-REFERENCE TO RELATED APPLICATIONS

This application is based upon and claims the benefit of priority of the prior International Application No. PCT/JP2006/318302, filed Sep. 14, 2006, the entire contents of which are incorporated herein by reference.

FIELD

The embodiments discussed herein is related to image processing for combining a plurality of shot still images, and to the technology of overlaying images such as a camera shake correcting technique.

BACKGROUND

Recently, a correction for camera shake on an image shot by a shooting device such as a digital camera etc. is performed by combining continuously shot images with short exposure. The images are combined by continuously shooting a specific subject and aligning continuously shot images. The last composite image is obtained by combining (adding and averaging pixel values) a plurality of images of pixels at the same positions, but the number of images used in combining the images can be different depending on the areas.

Since there can be a movement of a subject in addition to camera shake in the continuously shot images, a subject can be multiplexed in a simple addition. If the correlation between the continuously shot images is detected, and there is no pixel difference, then the images are combined, and if there is a pixel difference, then a different image is not used in the combination, thereby preventing a multiplexed image (detection of motion area). If there is a displacement between the images, there are an area where an image overlays on another image and an area where images do not overlay on other images. A plurality of images can be combined in a common area, but cannot be combined in other areas. Thus, continuously shot images can be combined as a composite image in which a one image area, two combined image area, a three combined image area, etc. coexist. Noise of an image can be different the number of images used in the combination. For example, noise is reduced in a larger number of combined images because random noise is averaged by combining a plurality of images. Therefore, one image includes an area where there is a large amount of noise and an area where there is a small amount of noise.

Thus, to make a clear shot image, a sharpening process has been performed on such a composite image. However, in the sharpening process, the sharpness of an image can be improved in the sharpening process, but noise is emphasized. Therefore, a highest possible adjustment to improve the sharpness without emphasizing noise is normally made.

In addition, in an image as a result of a correction for camera shake on simply combined images, areas including different numbers of overlaid images coexist. Therefore, the amount of noise depends on the number of overlaid images, and when the sharpening process is performed on the basis of the area having a smaller number of overlaid images, the sharpness is reduced without a strong sharpening process. Additionally, the noise is emphasized if the process is performed on the basis of an area having a larger number of overlaid images.

Under the circumstances, the patent document 1 proposes the technology of decreasing or increasing the number of combined images depending on the motion vector (a motion area and a no-motion area) between the frames of the moving pictures, and inserting into the first frame of the moving pictures and combining the pixels of a plurality of frames depending on the number of combined images.

However, according to the patent document 1, it is difficult to convert a plurality of low resolution images into high resolution images in high image quality, the n-th frame and the (n+a)-th frame are input, and images are combined using a+1 images and an intermediate frame generated by the insertion from a+1 images.

On the other hand, images are images are combined from a plurality of images, two frames used in combining images depending on the motion vector are changed, and the interval a between the two frames is shortened. It is a "determination of an image used in the combination", and no description is made as to what process is performed on an image as a combination result.

The patent document 2 proposes switching a method of combining images (image processing) depending on the result obtained from the motion vector for each area after combining images for each area.

However, according to the patent document 2, the shake of an image includes "subject shake" and "camera shake", and the shake cannot be simultaneously removed in the same shake removing process. In addition, the camera shake and the subject shake are detected, and image processing is performed depending on the type of shake. Although the image processing is switched depending on the type of detected shame, the determination reference is the "type of shake", not the number of combined images. The image processing is switched by a different trigger.

That is, the patent document 1 determines the frame used in combining images depending on the motion vector. The patent document 2 switches the processes depending on the type of shake.

The patent document 3 proposes a system of discriminating from a character area and a gray-scale image area using a reader for reading an original image, and processing (shading, outlining, etc.) each area using a different parameter.

However, according to the patent document 3, one image is divided into a plurality of areas and the areas are processed using different parameters, but it is an image separating method for dividing an image into a plurality of areas on the basis of the image combining process for a plurality of images and performing processes using different parameters, but not separating an area from one image.

The patent document 4 proposes a system of reading a shot image, separating a main area from a background area, and performing image processing on the main area or the background area by a color reproduction parameter.

However, according to the patent document 4, an image is separated and different image processing is performed on the image, but a main portion is separated from a background on the basis of one image. That is, a different image separating method is used.

The patent document 5 proposes a system of extracting only a subject from an image including a subject and an image not including a subject.

However, according to the patent document 5, an area is separated using a plurality of images, but the separating method is used to combine a plurality of images. Additionally, to perform different processes on the respective areas for a composite image, different processes are performed on the original image before the separation to easily perform an extracting operation.

The patent document 6 proposes image processing performed depending on an area by extracting a specific area from a color image.

However, if the number of combined images can be different depends on the image area, the amount of noise of a finally obtained image depends on the number of combined images. Therefore, the amount is not constant, and a noise removing process is to be performed. In addition, although a noise removing process can be performed only on a target portion by performing an image analysis (detecting an edge portion), the image analysis is accompanied by a complicated process, thereby incurring a prolonged processing time and a larger circuit. Additionally the image analysis does not always produce a desired result.

For example, when a noise removing process is performed, the process has been performed using the same parameter on the entire image, the noise removing process is performed on a portion including much noise but not performed on an edge portion, thereby performing the image area and switching parameters depending on the analysis result.

In the noise removing process, a filtering process is performed on an image. When it is performed on a noise area, noise is reduced. However, when it is performed on an edge portion, the edge becomes unclear, and the sharpness is degraded. Furthermore, if it is performed uniformly on the entire image using the same parameter, then there can be an area (an edge portion etc.) subject to a side effect. Therefore, the process can be moderately performed not to cause a side effect.

Patent Document 1: Japanese Laid-open Patent Publication No. 2000-194845
Patent Document 2: Japanese Laid-open Patent Publication No. 2003-134385
Patent Document 3: Japanese Patent No. 3023374
Patent Document 4: Japanese Patent No. 3408770
Patent Document 5: Japanese Laid-open Patent Publication No. 8-194113
Patent Document 6: Japanese Laid-open Patent Publication No. 11-266358

SUMMARY

An image processing device according to an aspect of the present invention acquires a plurality of images, generates a composite image, and includes: a unit for determining the number of combined images for detecting the number of combined images of the composite image for each area (which may be one or more pixels) of the composite image when the composite image is composed, and storing the number as the information about the number of combined images; and an image processing parameter switch unit for switching a parameter of image processing performed on each area of the composite image according to the information about the number of combined images, and/or an image processing switch unit for switching image processing performed on each area of the composite image according to the information about the number of combined images.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 illustrates the method of detecting a motion area;
FIG. 7 illustrates a database indicating the number of combined images and the outline intensity according to the embodiment 2;
FIG. 8 is a block diagram of the configuration according to the embodiment 3;
FIG. 9 illustrates the database indicating the number of combined images and the filter size according to the embodiment 3;
FIG. 12 illustrates a database indicating the number of combined images and the inclination according to the embodiment 5.

DESCRIPTION OF EMBODIMENTS

The present invention aims at providing an adaptive image processing device and its program for changing a process on each area of a composite image configured by combining a plurality of images, and performing image processing on a composite image containing areas having different characteristics in an image with a simple configuration.

Preferred embodiments of the present invention will be explained with reference to accompanying drawings.

Embodiment 1

When image processing such as a sharpening process, a noise removing process, a tone curve correcting process, etc. is performed on a composite image obtained by combining a plurality of images using a motion area detecting method, a common area detecting method, etc., the present invention changes a parameter for each image processing according to the information (information about the number of combined images) about the number of combined images for each area configuring the composite image.

(Description of the Configuration)

Figure 1:
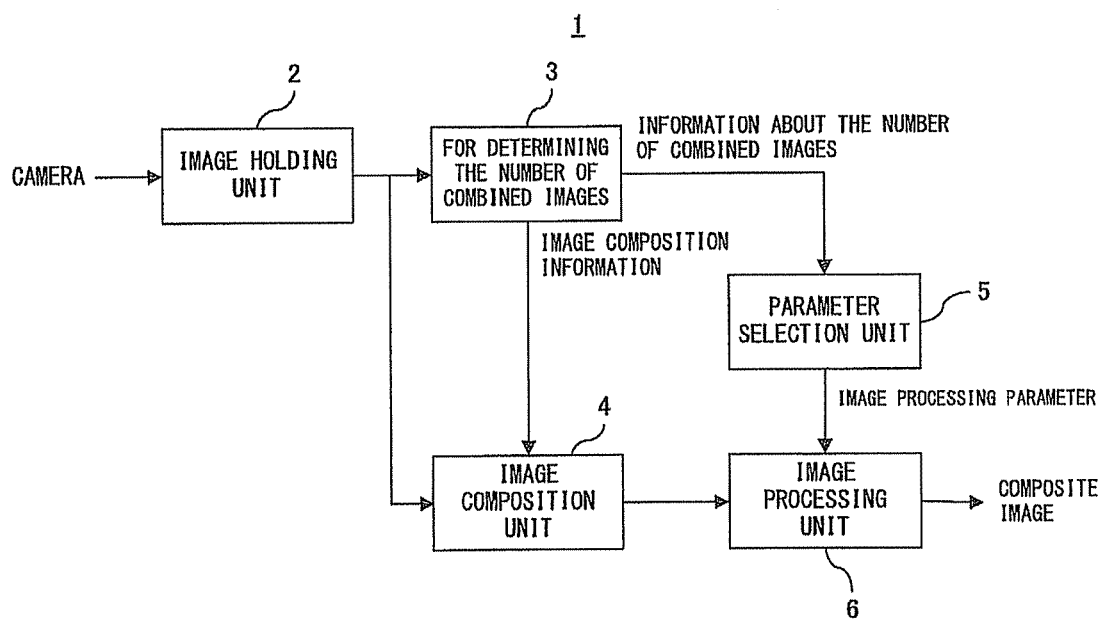
FIG. 1 is a block diagram illustrating the embodiment 1.

FIG. 1 is a block diagram of an image processing device 1. The image processing device 1 is configured by an image holding unit 2, a unit 3 for determining the number of combined images, an image composition unit 4, a parameter selection unit 5, and an image processing unit 6.

The image processing device 1 is provided in, for example, a digital camera etc. An image pickup unit (not illustrated in the attached drawings) provided with an image pickup element such as an optoelectronic conversion element etc. performs image pickup control during shooting and captures an image of any subject. The image pickup control controls the shooting conditions such as again value (sensitivity) of the image pickup unit, exposing time, etc. That is, the shooting conditions set by a user are input, and the shooting conditions of the image pickup unit are appropriately set.

The image holding unit 2 (frame memory) stores image data such as an image frame shot by an image pickup unit. For example, plural pieces of image data shot in a time series by an image pickup unit are stored. The image data is transferred to the unit 3 for determining the number of combined images and the image composition unit 4 at the subsequent stages.

The unit 3 for determining the number of combined images calculates the amount of displacement for each area (configured by a pixel and a plurality of pixels), determines the number of combined images by the motion area detecting method, the common area detecting method, etc., and transfers the image composition information to the image composition unit 4 and the parameter selection unit 5. The image composition information includes the information about the number of combined images about the number of combined images for each area, and can also include information necessary during combination of images.

The sensitivity of the image data, the shooting parameter etc. indicating the shooting conditions such as exposing time etc. can also be output together with the image data to the unit 3 for determining the number of combined images and the image composition unit 4.

The image composition unit 4 acquires the image data stored in the image holding unit 2, and combines images according to the image composition information (including the information about the number of combined images) generated by the unit 3 for determining the number of combined images.

The parameter selection unit 5 switches the parameters for the image processing such as a sharpening process, a noise removing process, a tone curve correcting process, etc. to be performed by the image processing unit 6 on the composite image generated by the image composition unit 4 according to the information about the number of combined images. The parameters can be switched according to the information about the number of combined images.

The image processing device 1 can be realized as a program executed by an electronic device (computer) of a digital camera, a mobile telephone with a camera, a PDA with a camera, a personal computer with a camera, etc. by software. Otherwise, it can be realized by hardware. Furthermore, it can also be realized as firmware fixedly incorporated as software into a computer of an electronic device etc.

(Description of Operations)

Figure 2:
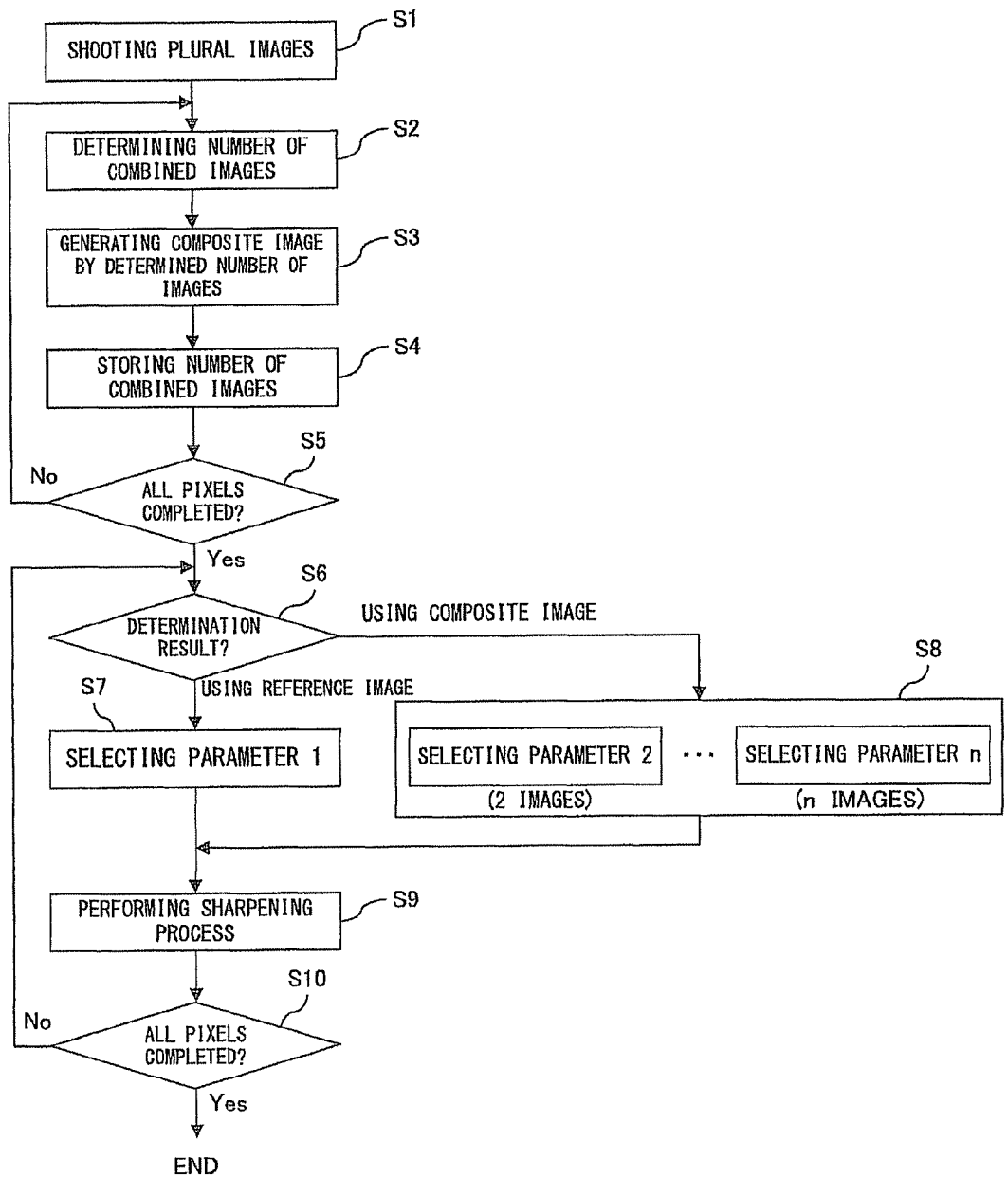
FIG. 2 is a flowchart of the operation of the embodiment 1.

FIG. 2 is a flowchart of the operations according to the present invention.

In step S1, a plurality of still images are acquired by shooting (continuous shooting, panoramic shooting, etc.), and stored in the image holding unit 2 (frame memory).

In step S2, the number of combined images is determined. The number of combined images (information about the number of combined images) is determined for each area (that can be a pixel or a plurality of pixels) of a plurality of images acquired in step S2. The number of combined images is determined in a motion area detecting method, a common area detecting method, etc.

FIG. 3 illustrates the principle of detecting a motion area.

For example, three continuously shot images, that is, images 31 through 33 (images 1 through 3) illustrated in FIG. 3 are stored in the image holding unit 2. After the characteristic point of each image is detected and aligned, the images are simply combined to generate a composite image 34 (simple composite image) of multiplexed vehicles as illustrated in FIG. 3. Next, the difference between the pixel values at the same positions is calculated, and the portion indicating the value equal to or exceeding a predetermined threshold is detected as a motion area.

The image 35 (detecting a motion) illustrated in FIG. 3 indicates a motion area in "white" and a no-motion area in "black". For example, the image 36 (motion area removed image 1) is a composite image of the image 32 (image 2) as a motion area illustrated in FIG. 3 and a resultant image of the combination of three images as a no-motion area. Since the image 36 illustrated in FIG. 3 is a mixed image in which the "white" area of the image 35 illustrated in FIG. 3 is a single image, and the "black" area is a composite image from 3 images, only the background is extracted by removing the vehicle on the basis of the motion detection result of the image 35 illustrated in FIG. 3. As a result, the image 37 (motion area removed image 1) illustrated in FIG. 3 can be acquired as a composite image.

The composite image of the image 37 illustrated in FIG. 3 is also a mixed image of a one image area, a 2-image combined area, and a 3-image combined area.

A common area is used in a method of determining the number of combined images.

Figure 4:
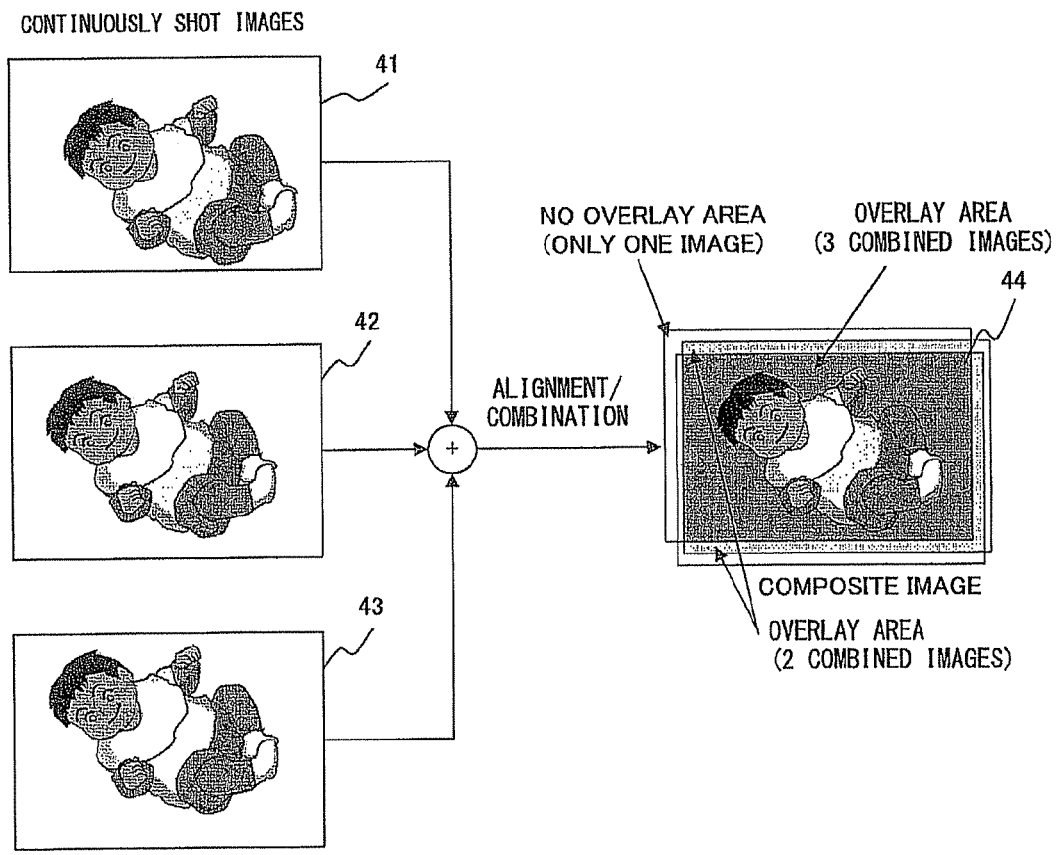
FIG. 4 illustrates the method of detecting a common area.

FIG. 4 illustrates the principle of detecting a common area. Although a subject is not moving, the shooting areas can be subtly different. For example, continuously shot images are acquired and combined as shown by the images 41 through 43 as illustrated in FIG. 4. In this case, a composite image 44 is obtained as illustrated in FIG. 4. That is, if the three images are overlaid after the characteristic points are detected, there appears a 3-image combined area at the center, and coexist a composite image from 2 images and one image area coexist.

Figure 5A:
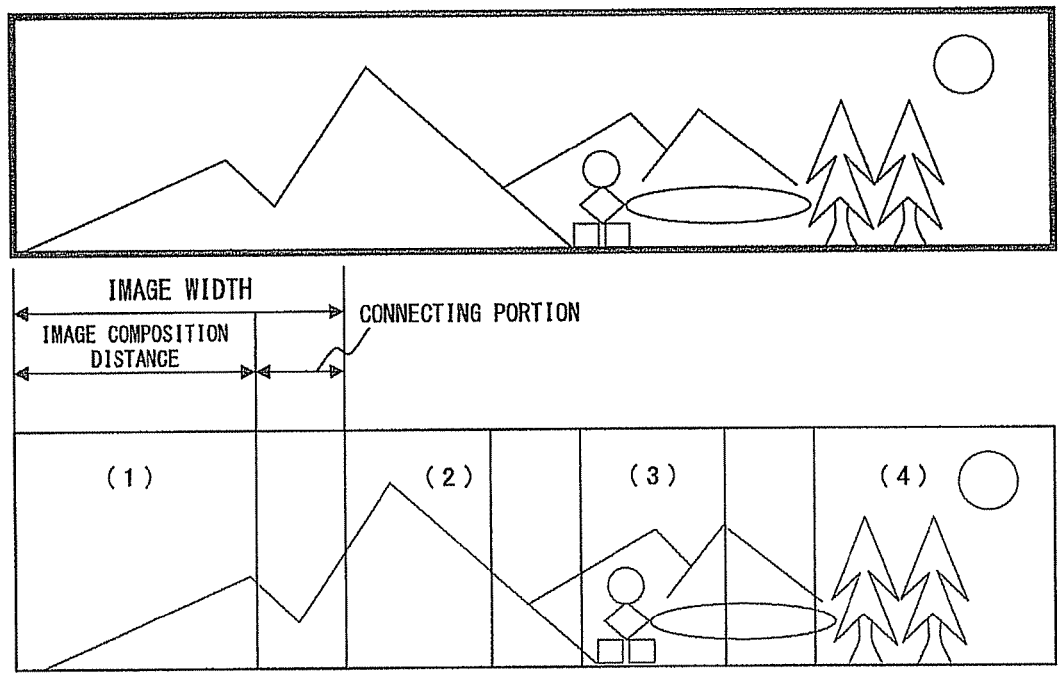
FIG. 5A illustrates the method of detecting a common area (panoramic shooting)

In the example illustrated in FIG. 4, the 3-image combined area is larger than other common areas. However, when a mosaic panoramic image is generated as illustrated in FIG. 5A, a connecting portion between the images is a composite image from 2 images, and the others are one image areas. Panoramic expression leaves a common area (connecting portion) during shooting, continuously shooting is performed by panning a camera, the connecting portions are combined, and a landscape image is generated. In this case, the connecting portions are a composite image from 2 images, and the others are single images.

Figure 5B:
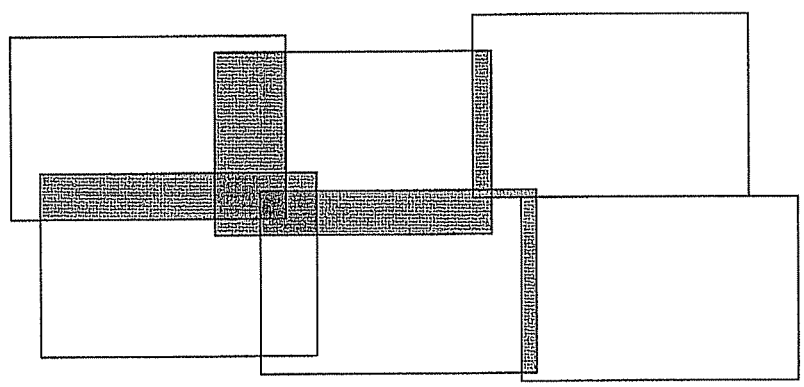
FIG. 5B illustrates the method of detecting a common area (panoramic shooting)

In addition, as illustrated in FIG. 5B, the panoramic expression can be realized not only in the horizontal direction, but also in the vertical direction, the horizontal and vertical directions, etc. Therefore, the image combined area is realized not only as one image area and 2-image combined area, but also as a 3-image combined area, a 4-image combined area, and other variations.

In step S3, images are combined. Images are combined on the basis of the number of combined images of each area (configured by a pixel and a plurality of pixels) detected in step S2. Then, in step S4, the number of combined images of each area is stored in the memory as information about the number of combined images.

In step S5, it is determined whether or not images have been combined for all areas. If images have been combined in all areas, control is passed to step S6. Otherwise, control is passed to step S2, and the combination is continued.

In step S6, a determination of parameter switching is performed on the basis of the result of the image combining process performed in steps S1 through 4 and the process of determining the number of combined images for each area. If the number of combined images is one, control is passed to step S7 (a reference image is used). If the number of combined images is two or more, control is passed to step S8. In step S7, the setting of image processing corresponding to the case on one image is selected. The parameter selection unit 5 selects the setting of a parameter when image processing is performed.

In step S8, if the number of images is two or more (2 through n in the present example) and the number of combined images is two, then a parameter used when the number of images is two is selected. The parameter selection unit 5 selects the setting of a parameter when image processing is performed.

The parameter set in steps S7 an S8 is stored in the parameter selection unit 5 using the parameter value corresponding to the number of combined images as a database, or dedicated memory can be prepared. The image processing parameter switching process acquire the number of combined images to switch a parameter for each image processing (sharpening process, noise removing process, and tone curve correcting process) from the information about the number of combined images stored for each area.

In step S9, the image processing selected in step S7 or S8 corresponding to the image processing on an area of a composite image is performed on each area of the composite image. In step S10, it is determined whether or not the composition has been performed on all areas. If the composition has been completed on all areas, the process terminates. Otherwise, control is passed to step S6, and the image processing is continued.

In the method above, area adaptive image processing can be realized, and a side effect of the noise removing process (unclear image etc.) can be reduced without a complicated process such as an image area etc.

In addition, by changing a parameter of the image processing on a composite image depending on the number of combined images of the composite image, a parameter is switched on the basis of the number of combined images when a combining process is performed, thereby requiring no necessity to perform an adding process (dividing an area, detecting an amount of noise, etc.).

Furthermore, when the number of combined images is two or more, the parameter is stored, and the parameter not held for the number of combined images can be generated by interpolating a held parameter.

Embodiment 2

Since the amount of noise decreases in proportion to the number of combined images in a composite image, the number of combined images is stored, and the intensity of the sharpening process is switched depending on the number of combined images.

Figure 6:
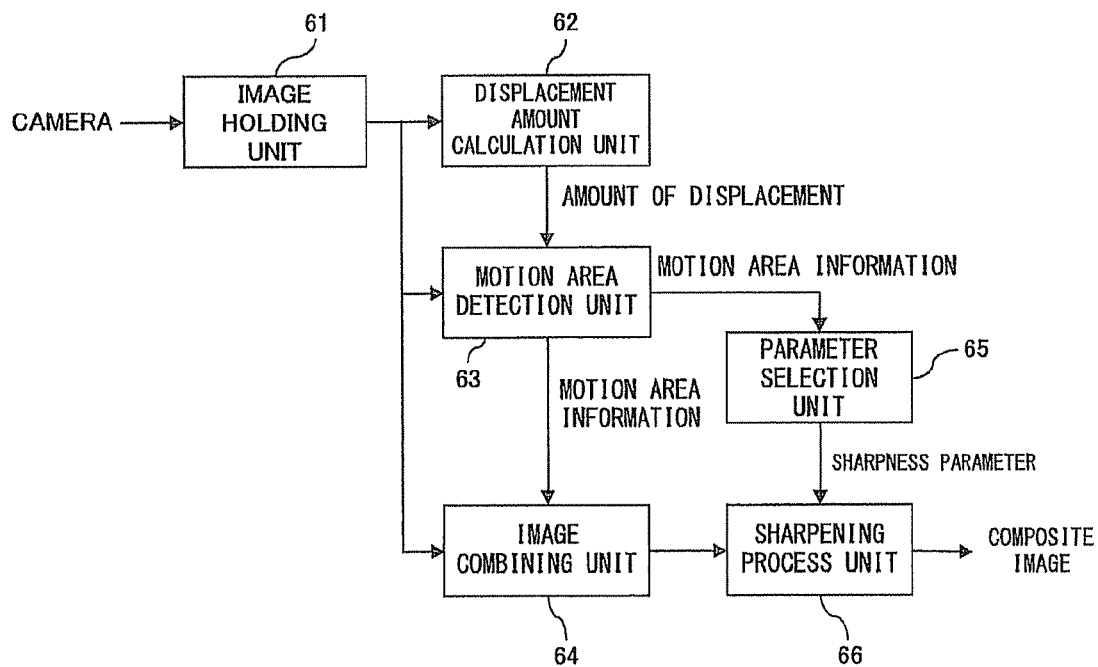
FIG. 6 is a block diagram of the configuration according to the embodiment 2.

FIG. 6 is a block diagram according to the embodiment 2. The embodiment 2 is configured by an image holding unit 61, a displacement amount calculation unit 62, a motion area detection unit 63, an image combining unit 64, a parameter selection unit 65, and a sharpening process unit 66. In the embodiment 2, the unit 3 for determining the number of combined images in the block diagram illustrated in FIG. 1 is configured by the displacement amount calculation unit 62 and the motion area detection unit 63, and the image processing unit 6 is configured by the sharpening process unit 66.

The displacement amount calculation unit 62 calculates the amount of displacement in the same areas (as a pixel or a pixel block including a plurality of pixels) of a plurality of images in the image holding unit 61, and outputs the result to the motion area detection unit 63.

The motion area detection unit 63 includes a threshold setting unit, a motion determination unit, an isolated point noise determination unit, and a determination buffer.

The threshold setting unit calculates a first determination threshold and a second determination threshold depending on the shooting time parameter, and outputs a calculation result to the motion determination unit and the isolated point noise determination unit respectively. That is, the first determination threshold is formed by a threshold d_exposure determined on the basis of an exposing time te or a threshold d_gain determined on the basis of a gain value g. The second determination threshold is also determined as a threshold I_exposure or a threshold I_gain on the basis of the exposing time te or the gain value g.

The motion determination unit determines whether or not the area corresponding to a plurality of images is a motion area on the basis of the size of the amount of displacement Δa. Practically, it compares the difference value Δa with the first determination threshold, determines that there is a motion when the difference value Δa is larger than the first determination threshold, and outputs a motion determination result to a determination buffer.

The determination buffer records, for example, a motion determination result in a bit map. If it is determined that the area of the pixel (x,y) of each of the images to be compared has a motion, then "1" is set in the position of M (x,y) of the bit map, and "0" is set when there is no motion.

The isolated point noise determination unit further determines whether or not M (x,y) of the pixel determined by the motion determination unit as having a motion is isolated point noise. If it is determined as noise, then M (x,y) is set as having no motion ("0"). Practically, by referring to the determination results at eight points surrounding M (x,y) of the target pixel, the number of pixels determined as having a motion is counted. If the count value is smaller than the second determination threshold (threshold I_exposure or threshold I_gain), then it is determined as an isolated point noise, and M (x,y) is set as having no motion ("0").

If it is determined that there is a motion on the basis of the determination result above, then no-motion areas are combined, and a motion area is not combined. For example, if there are no motions in three images, the motion area information (information about the number of combined images) in the area holds 3. If there is a motion, a reference image is used, and the motion area information (information about the number of combined images) holds 1.

The image combining unit 64 combines images according to the motion area information (information about the number of combined images).

The parameter selection unit 65 sets in advance the number of combined images and the outline intensity (outline intensity parameter (sharpness parameter)) for performing a sharpening process according to the embodiment 2. For example, using a clearing filter, the difference in density value (outline intensity) between the pixels is expanded for sharpness. The database as illustrated in FIG. 7 is prepared, the outline intensity in the area having the number of combined images of "1" is set as 30, the outline intensity in the area having the number of combined images of "2" is set as 20, the outline intensity in the area having the number of combined images of "3" is set as 10, and the values are stored in the memory etc.

The sharpening process unit 66 performs the sharpening process on the basis of the outline intensity parameter corresponding to each area of a composite image. That is, the sharpening process is performed on the basis of the outline intensity set for each area.

Embodiment 3

FIG. 8 is a block diagram according to the embodiment 3. The embodiment 3 is configured by an image holding unit 81, a displacement amount calculation unit 82, a common area detection unit 83, an image combining unit 84, a parameter selection unit 85, and a noise removing processing unit 86. In the embodiment 3, the unit 3 for determining the number of combined images in the block diagram illustrated in FIG. 1 is configured by the displacement amount calculation unit 82 and the common area detection unit 83, and the image processing unit 6 is configured in the sharpening process unit 66.

The displacement amount calculation unit 82 calculates the amount of displacement in the same areas (a pixel or a pixel block including a plurality of pixels) in a plurality of images of the image holding unit 81, and outputs the amount to the common area detection unit 83.

The common area detection unit 83 detects the characteristic points of a plurality of images stored in the image holding unit 81, and detects a 3-image combined area obtained by overlaying three images, a 2-image combined area, and a one image area.

The image combining unit 84 combines each image according to common area information (information about the number of combined images).

The parameter selection unit 85 predetermines the number of combined images, a weighted average filter, a median filter, and a filter size (noise removal parameter) for a blurring process etc. to perform a noise removing process. For example, a database as illustrated in FIG. 9 is prepared, the filter size is set as 5×5 in the area having the number of combined images of "1", as 3×3 in the area having the number of combined images of "2", and as 1×1 in the area having the number of combined images of "3", and stored in the memory etc.

The noise removing processing unit 86 performs a noise removing process according to the noise removal parameter corresponding to each area of a composite image. That is, it performs the noise removing process on the basis of a filter size set for each area.

In addition, a connecting portion area in generating a panoramic image is detected so that a noise removal parameter can be switched depending on whether or not a connecting portion area is detected.

Embodiment 4

Figure 10:
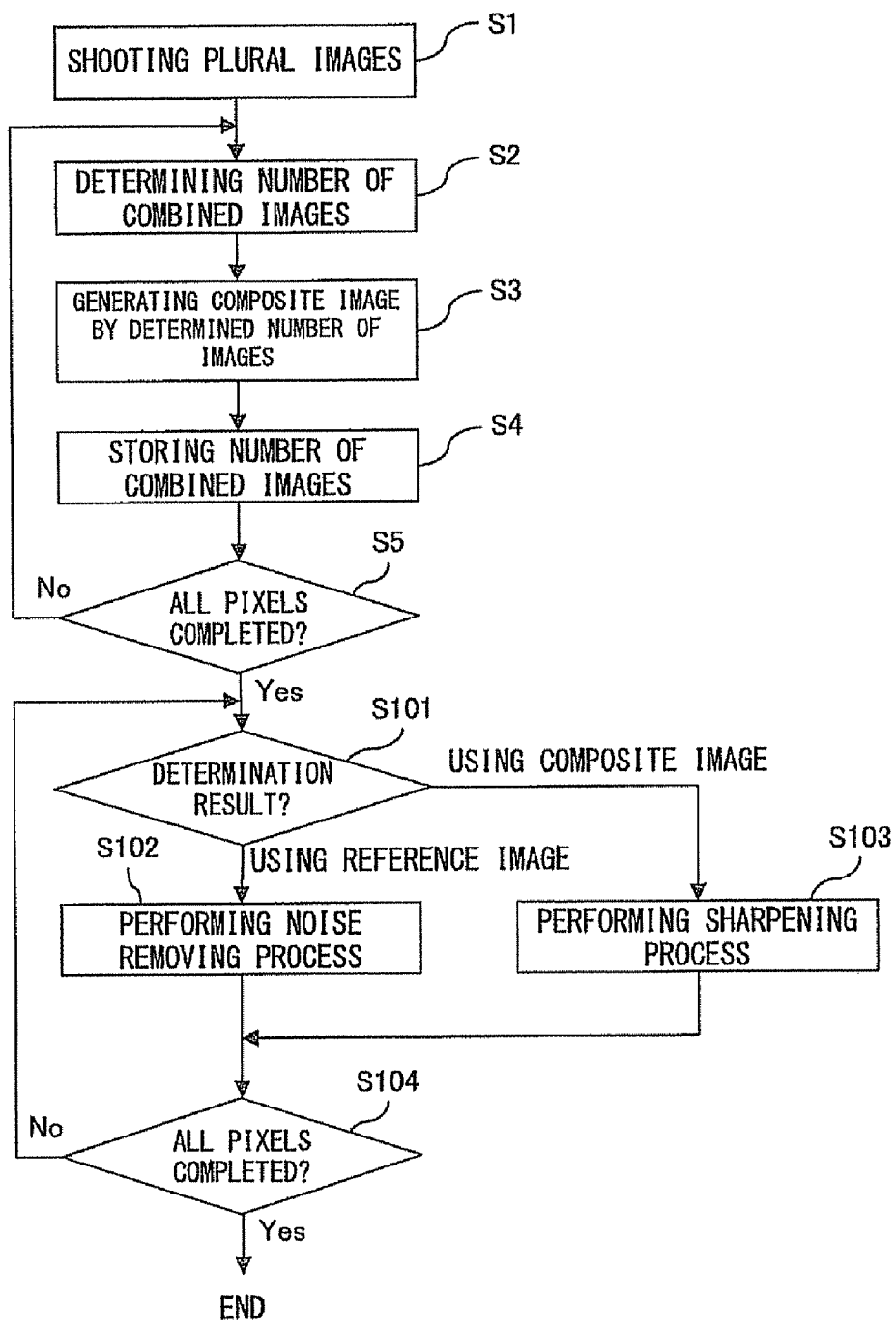
FIG. 10 is a flowchart of the operation according to the embodiment 4.

FIG. 10 is a flowchart of the operation performed when image processing is changed by the number of combined images.

In step S1, a plurality of images are shot (continuously shot, panoramic shot, etc.) and a plurality of still images are acquired. The images are stored in the image holding unit 2 (frame memory).

In step S2, the number of combined images is determined. The number of combined images (information about the number of combined images) is determined for each area (that can be a pixel or a plurality of pixels) of the plurality of images acquired in step S1. The determination of the number of combined images can be made by, for example, a motion area detecting method and a common area detecting method.

In step S3, images are combined on the basis of the number of combined images in each area (configured by a pixel or a plurality of pixels) detected in step S2. In step S4, the number of combined images in each area is stored as information about the number of combined images in the memory.

In step S5, it is determined whether or not images have been combined in all areas. if images have been combined in all areas, control is passed to step S6. Otherwise, control is passed to step S2, and the combining process is continued.

In step S101, after performing the image combining process and process of determining the number of combined images for each area in steps S1 through S4, a determination for switching image processing for each area of a composite image is performed. Image processing is switched to switch the sharpening process and the noise removing process according to the information about the number of combined images stored for each area. If the number of combined images is 1, control is passed to step S102 (using a reference image). If the number of combined images is two or more, control is passed to step S103.

In this embodiment, the process is switched depending on the number of combined images, that is, one or two or more, but the present invention is not limited to these values. The noise removing process can be performed when the number of combined images is N (N>1), and the sharpening process can be performed when the number of combined images is M (M>N). In step S102, the noise removing process is performed by selecting the noise removing process when the information about the number of combined images is 1.

In step S103, when the information about the number of combined images refers to a plurality of images, and when, for example, two images are combined, that is, the information about the number of combined images refers to two images, the sharpening process is selected and performed.

In the process in step S103, when the number of combined images refers to a large value, a high parameter is selected for the sharpening process, and a lower sharpening process is performed in an area where the number of combined images is smaller. Thus, the intensity of the parameter for the image processing can be changed depending on the number of combined images.

In step S104, it is determined whether or not images have been combined for all areas. If images have been combined in all areas, the process terminates. Otherwise, control is passed to step S101, thereby terminating the image processing.

Embodiment 5

Figure 11:
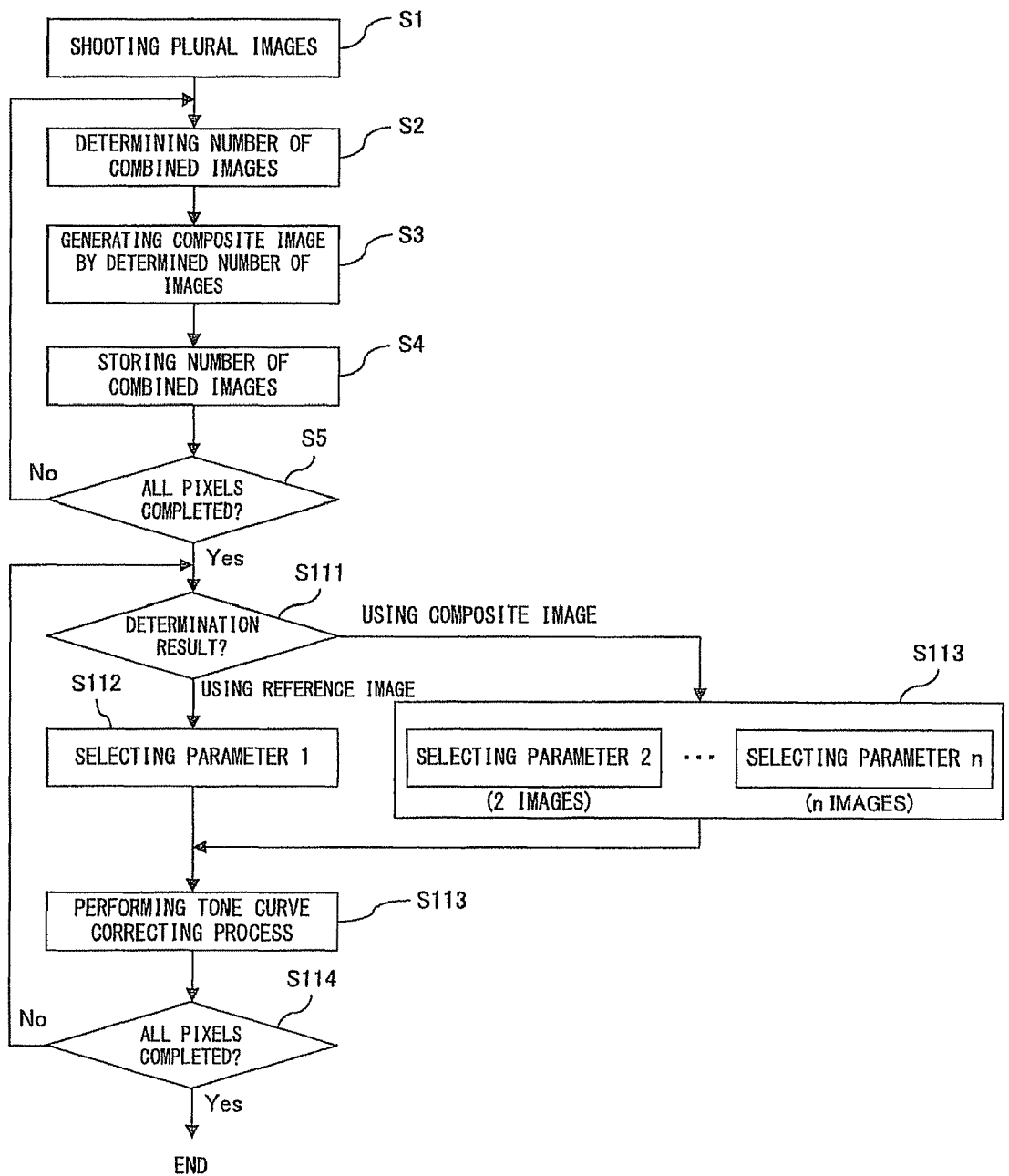
FIG. 11 is a block diagram of the configuration according to the embodiment 5.

FIG. 11 is a flowchart of the operation of a tone curve correcting process.

In step S111, after performing the image combining process and the process of determining the number of combined images for each area in steps S1 through S4, a determination is performed to switch a tone curve correcting process for each area of a composite image. The tone curve correcting process is switched by switching a tone curve correction parameter according to the information about the number of combined images stored for each area. If the number of combined images refers to one image, control is passed to step S112 (using a reference image). If the number of combined images refers to a plurality of images, control is passed to step S113.

In step S112, when the information about the number of combined images refers to one image, the tone curve correction parameter for one image is selected, and the tone curve correcting process is performed.

In step S113, when the information about the number of combined images refers to a plurality of images, for example, when the number of combined images is 2, a tone curve correction parameter for two images is selected, and the tone curve correcting process is performed.

For example, a tone curve correction parameter performs a tone curve correcting process using a gamma characteristic. FIG. 12 illustrates the database for the process. When the number of combined images is 1, the inclination of 3 is selected. When the number of combined images is 2, the inclination of 1.5 is selected. When the number of combined images is 3, the inclination of 1 is selected. When a gamma correction is performed, a tone curve correction parameter is set so that the gamma value can be 1. Furthermore, for the number of combined images not set as a parameter, an applicable gamma value can be calculated by interpolation.

In step S114, it is determined whether or not image have been combined for all areas. If the tone curve correcting process has been performed for all areas, the process terminates. Otherwise, control is passed to step S111, thereby continuing the image processing.

(Variation Example)

Described next is the method of detecting a fault (color, brightness, etc.) of an image as an example of determining the number of combined images. Shot images sometimes look bluish or reddish. Since the color of an entire image is adjusted on the basis of "white" in the image, "white" as the reference can be nullified (by frame out etc.) and red is to be corrected as white when a reddish color is erroneously detected as "white", thereby generating an entirely bluish image. If the image is used in combining images, the color as a result of combining images becomes abnormal. Therefore, it is to be deleted from the images to be combined.

Additionally, using an external PC for a computer (including a CPU, an information processing device, etc.) provided in a multi-channel data transfer device (LSI etc.), a predetermined program (multi-channel data transfer program) having the operations and steps of the embodiments above as a source is stored in memory (ROM etc.) and written to a computer during the boot to perform the steps.

Using a single computer (including an information processing device such as a CPU, an FPGA, etc.), a predetermined program (multi-channel data transfer program) having the steps of the embodiments 1 through 4 above as a source is stored in memory (ROM etc.) and written to a computer during the boot to perform the steps.

In addition, the present invention can also be embodied by generating a control program for directing a CPU of a standard computer (for example, an information processing device etc.) to perform a process of the above-mentioned flowcharts, recording the program on a computer-readable record medium, and directing the computer to read the program from the record medium to execute it by the CPU.

Figure 13:
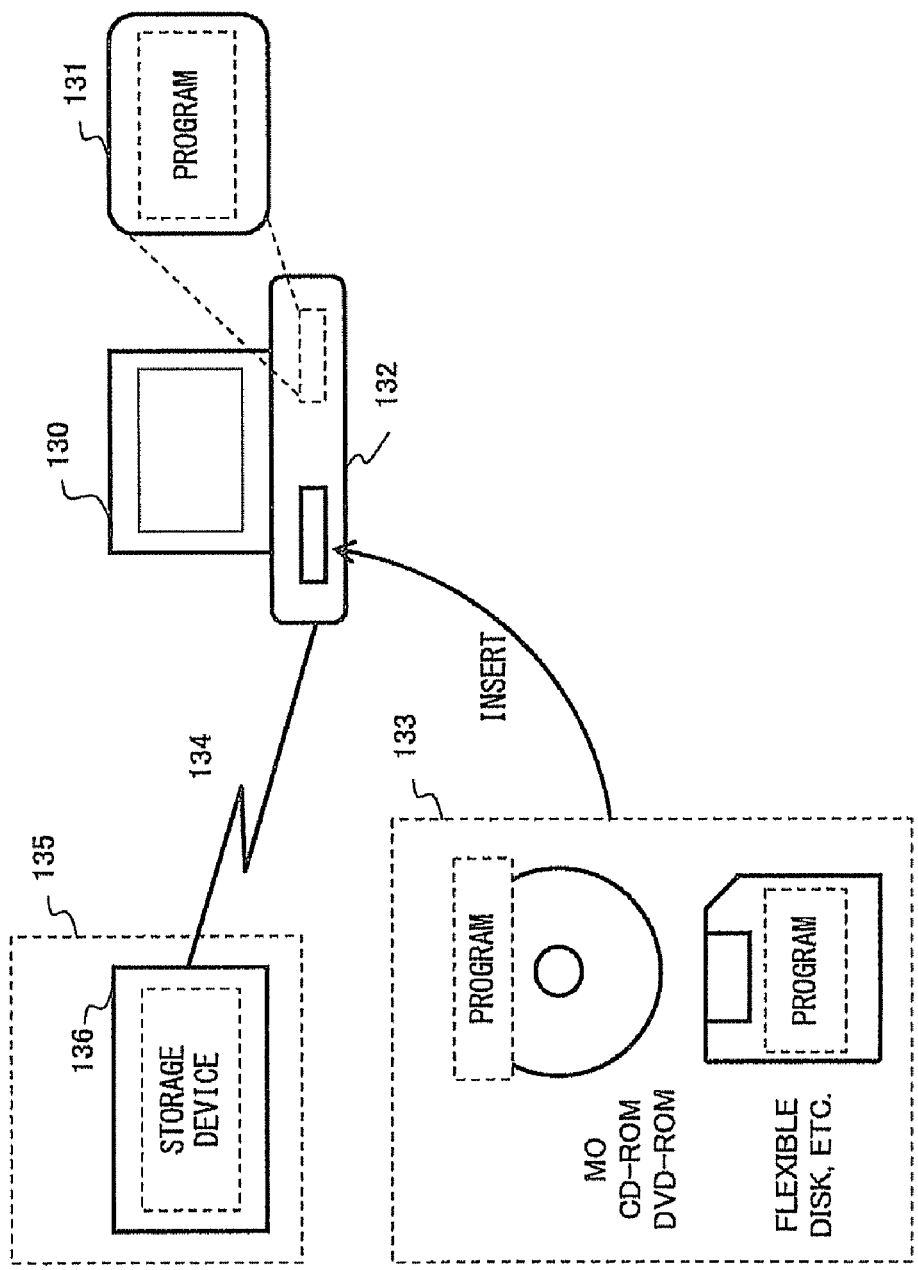
FIG. 13 illustrates an example of a configuration of a computer-readable record medium for a program.

FIG. 13 illustrates an example of a record medium from which the recorded control program can be read by a computer system. The record medium can be, for example, a storage device 131 such as built-in ROM, a hard disk device provided as an accessory to a computer system 130, etc., a portable 133 such as a flexible disk, an MO (magneto-optical disk device), CD-ROM, DVD-ROM, etc. capable of reading a control program recorded by inserting into a medium drive device 132 provided for the computer system 130, etc.

A record medium can be a storage device 136 provided for a computer system functioning as a program server 135 connected to the computer system 130 through a communication circuit 134. In this case, a transmission signal obtained by modulating a carrier wave using a data signal representing a control program is transmitted to the computer system 130 from the program server 135 through the communication circuit 134 as a transmission medium, and the computer system 130 can execute the control program by the CPU of the computer system 130 by regenerating the control program by demodulating the received transmission signal.

The present invention is not limited to the above-mentioned embodiments, but can be improved and modified in various manners within the scope of the gist of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An image processing device comprising:
   a determining unit for detecting a number of combined images for each area of a composite image generated from a plurality of the combined images and storing the number as information about the number of combined images for each area of the composite image when the composite image is generated;
   one of or both of an image processing parameter switch unit of switching a parameter of image processing performed on each area of the composite image according to the information about the number of combined images, the parameter being different for different numbers of combined images and an image processing switch unit for switching image processing performed on each area of the composite image according to the information about the number of combined images, the image processing being different for different numbers of combined images;
   a unit for generating a processed composite image according to one of or both of a result made by the image processing parameter switch unit and a result made by the image processing switch unit.

2. The device according to claim 1, wherein
   the determining unit comprises:
   a displacement amount calculation unit calculating an amount of displacement between the images; and
   a motion area detection unit detecting a motion area and a no-motion area of a subject between the images on a basis of the amount of displacement, generating motion area information, and changing the information about the number of combined images in the area according to the motion area information.

3. The device according to claim 1, wherein
   the determining unit comprises:
   a displacement amount calculation unit calculating an amount of displacement between the images; and
   a common area detection unit detecting a common area between the images shared among a plurality of images on the basis of the amount of displacement, generating common area information, and changing the information about the number of combined images in the area according to the common area information.

4. The device according to claim 1, wherein
   the determining unit calculates an amount of displacement of a color and an intensity level between the images, compares the amount with a predetermined amount of displacement, detects the image with an amount of displacement larger than the predetermined amount of displacement, deletes the detected image from the number of combined images, and performs the process of determining the number of combined images.

5. The device according to claim 1, wherein
   the image processing performed on each area of the composite image is a sharpening process.

6. The device according to claim 1, wherein
   the image processing performed on each area of the composite image is a noise removing process.

7. The device according to claim 1, wherein
   the image processing performed on each area of the composite image is a tone curve correcting process.

8. The device according to claim 1, wherein
the image processing switch unit performs a noise removing process when the information about the number of combined images of the area is N, and performs a sharpening process when the number of combined images is M (N<M).

9. A non-transitory computer-readable recording medium on which is recorded a program for causing a computer to execute an image process which acquires a plurality of images and generates a composite image, the process comprising:
a determining process for detecting a number of combined images for each area of the composite image generated from a plurality of the combined images and storing the number as information about the number of combined images for each area of the composite image when the composite image is generated;
one of or both of an image processing parameter switching process of switching a parameter of image processing performed on each area of the composite image according to the information about the number of combined images, the parameter being different for different numbers of combined images and an image processing switching process for switching image processing performed on each area of the composite image according to the information about the number of combined images, the image processing being different for different numbers of combined images; and
a generating process generating a processed composite image according to one of or both of a result made by the image processing parameter switching process and a result made by the image processing switching process.

10. The non-transitory computer-readable recording medium according to claim 9, wherein
the determining process calculates an amount of displacement between the images, detects a motion area and a no-motion area of a subject between the images on a basis of the amount of displacement and generates motion area information, and changes the information about the number of combined images in the area according to the motion area information.

11. The non-transitory computer-readable recording medium according to claim 9, wherein
the determining process detects an amount of displacement between the images, detects a common area between the images shared among a plurality of images on the basis of the amount of displacement and generates common area information, and changes the information about the number of combined images in the area according to the common area information.

12. The non-transitory computer-readable recording medium according to claim 9, wherein
the determining process calculates an amount of displacement of a color and an intensity level between the images, compares the amount with a predetermined amount of displacement, detects the image with an amount of displacement larger than the predetermined amount of displacement, deletes the detected image from the number of combined images, and performs the process of determining the number of combined images.

13. The non-transitory computer-readable recording medium according to claim 9, wherein
the image processing performed on each area of the composite image is a sharpening process, a noise removing process, or a tone curve correcting process.

14. The non-transitory computer-readable recording medium according to claim 9, wherein
the image processing switching process performs a noise removing process when the information about the number of combined images of the area is 1, and performs a sharpening process when the number of combined images refers to a plurality of images.

* * * * *

UNITED STATES PATENT AND TRADEMARK OFFICE
CERTIFICATE OF CORRECTION

PATENT NO. : 8,311,367 B2
APPLICATION NO. : 12/403027
DATED : November 13, 2012
INVENTOR(S) : Kimitaka Murashita et al.

It is certified that error appears in the above-identified patent and that said Letters Patent is hereby corrected as shown below:

On the Left hand Column of the Title page of the Patent, the Related U.S. Application Data should be added below the Prior Publication Data and above the International Classification as shown below:

Item --(63)    Related U.S. Application Data

Continuation of application No. PCT/JP2006/318302, filed on September 14, 2006--

Signed and Sealed this
Eleventh Day of March, 2014

Michelle K. Lee
*Deputy Director of the United States Patent and Trademark Office*